United States Patent
Kobayashi et al.

(10) Patent No.: US 12,499,822 B2
(45) Date of Patent: Dec. 16, 2025

(54) DISPLAY DEVICE

(71) Applicant: Sharp Display Technology Corporation, Kameyama (JP)

(72) Inventors: Masamitsu Kobayashi, Kameyama (JP); Takafumi Miura, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/851,196

(22) PCT Filed: Jul. 21, 2022

(86) PCT No.: PCT/JP2022/028324
§ 371 (c)(1),
(2) Date: Sep. 26, 2024

(87) PCT Pub. No.: WO2024/018582
PCT Pub. Date: Jan. 25, 2024

(65) Prior Publication Data
US 2025/0246134 A1    Jul. 31, 2025

(51) Int. Cl.
*H04N 9/64* (2023.01)
*G09G 3/3208* (2016.01)

(52) U.S. Cl.
CPC ... *G09G 3/3208* (2013.01); *G09G 2320/0271* (2013.01); *G09G 2340/0435* (2013.01); *G09G 2360/16* (2013.01)

(58) Field of Classification Search
CPC .............. G09G 3/36; G09G 3/3208; G09G 2320/0271; G09G 2340/0435; G09G 2360/16; H04N 5/00; H04N 5/21; H04N 5/76; H04N 5/217; H04N 5/222; H04N 5/228; H04N 5/225; H04N 5/232; H04N 5/265; H04N 9/54; H04N 9/77; H04N 19/53; H04N 19/59; H04N 19/517; H04N 19/523; H04N 19/577; H04N 23/68;
(Continued)

(56) References Cited

U.S. PATENT DOCUMENTS

2003/0174110 A1* 9/2003 Baba .................... G09G 3/3611
                                                                345/88
2006/0227249 A1  10/2006 Chen et al.
(Continued)

FOREIGN PATENT DOCUMENTS

JP  2009034757 A   2/2009
JP  2010021180 A   1/2010
WO  2007052441 A1  5/2007

OTHER PUBLICATIONS

International Search Report in PCT/JP2022/028324, mailed Sep. 20, 2022, 2 pages.

*Primary Examiner* — Chanh D Nguyen
*Assistant Examiner* — Nguyen H Truong
(74) *Attorney, Agent, or Firm* — Keating & Bennett, LLP

(57) ABSTRACT

A main calculation unit generates emphasized Y luminance data by performing luminance emphasis processing on only Y luminance data included in YUV data representing an image of one frame. Further, the main calculation unit generates blurred Y luminance data by performing luminance blur processing on only the Y luminance data. In this way, it is possible to perform processing for improving the display quality of a moving picture in a shorter time period.

6 Claims, 27 Drawing Sheets

(58) Field of Classification Search
CPC ... G06K 9/20; G06K 9/36; G06K 9/40; G06T 3/40; G06T 5/00; G06T 5/50; G06T 9/00; G06T 15/00; G06T 7/11; G06T 7/571; G06V 10/60

See application file for complete search history.

(56) References Cited

U.S. PATENT DOCUMENTS

| | | |
|---|---|---|
| 2008/0180424 A1 | 7/2008 | Ishihara |
| 2008/0279470 A1* | 11/2008 | Warmuth ............. G09G 3/3611 382/255 |

* cited by examiner

| | X1 | X2 | X3 | X4 | X5 | · · · |
|---|---|---|---|---|---|---|
| n-th FRAME | I1 (n) | I2 (n) | I3 (n) | I4 (n) | I5 (n) | · · · |
| (n+1)-th FRAME | I1 (n+1) | I2 (n+1) | I3 (n+1) | I4 (n+1) | I5 (n+1) | · · · |

FIG. 3

|  | X1 | X2 | X3 | X4 | X5 | ... |
|---|---|---|---|---|---|---|
| n-th FIRST-HALF SUB-FRAME | F1 (n) | F2 (n) | F3 (n) | F4 (n) | F5 (n) | ... |
| n-th SECOND-HALF SUB-FRAME | S1 (n) | S2 (n) | S3 (n) | S4 (n) | S5 (n) | ... |
| (n+1)-th FIRST-HALF SUB-FRAME | F1 (n+1) | F2 (n+1) | F3 (n+1) | F4 (n+1) | F5 (n+1) | ... |
| (n+1)-th SECOND-HALF SUB-FRAME | S1 (n+1) | S2 (n+1) | S3 (n+1) | S4 (n+1) | S5 (n+1) | ... |

FIG. 4

| A11 | A21 | A31 | A41 | A51 | A61 | A71 | A81 | A91 |
|-----|-----|-----|-----|-----|-----|-----|-----|-----|
| A12 | A22 | A32 | A42 | A52 | A62 | A72 | A82 | A92 |
| A13 | A23 | A33 | A43 | A53 | A63 | A73 | A83 | A93 |
| A14 | A24 | A34 | A44 | A54 | A64 | A74 | A84 | A94 |
| A15 | A25 | A35 | A45 | A55 | A65 | A75 | A85 | A95 |
| A16 | A26 | A36 | A46 | A56 | A66 | A76 | A86 | A96 |
| A17 | A27 | A37 | A47 | A57 | A67 | A77 | A87 | A97 |
| A18 | A28 | A38 | A48 | A58 | A68 | A78 | A88 | A98 |
| A19 | A29 | A39 | A49 | A59 | A69 | A79 | A89 | A99 |

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| n-th FIRST-HALF SUB-FRAME | 0.25 | 0.25 | 0.25 | 0.25 | 0.25 | 0.25 | 0.25 | 0.24 | 0.23 | 0.22 | 0.21 | 0.19 | 0.17 | 0.15 | 0.12 | 0.6 | 0.58 | 0.56 | 0.55 | 0.53 |
| n-th SECOND-HALF SUB-FRAME | 0.26 | 0.27 | 0.28 | 0.29 | 0.3 | 0.32 | 0.33 | 0.35 | 0.36 | 0.38 | 0.39 | 0.41 | 0.42 | 0.44 | 0.45 | 0.46 | 0.47 | 0.48 | 0.49 |
| (n+1)-th FIRST-HALF SUB-FRAME | 0.23 | 0.22 | 0.21 | 0.19 | 0.17 | 0.15 | 0.12 | 0.6 | 0.58 | 0.56 | 0.55 | 0.53 | 0.52 | 0.51 | 0.51 | 0.5 | 0.5 | 0.5 | 0.5 | 0.5 |
| (n+1)-th SECOND-HALF SUB-FRAME | 0.35 | 0.36 | 0.38 | 0.39 | 0.41 | 0.42 | 0.44 | 0.45 | 0.46 | 0.47 | 0.48 | 0.49 | 0.49 | 0.5 | 0.5 | 0.5 | 0.5 | 0.5 | 0.5 | 0.5 |

| | | | | | | | | ╭31 |
|---|---|---|---|---|---|---|---|---|
| 1 | 2 | 3 | 4 | 5 | 4 | 3 | 2 | 1 |
| 2 | 4 | 6 | 8 | 10 | 8 | 6 | 4 | 2 |
| 3 | 6 | 9 | 12 | 15 | 12 | 9 | 6 | 3 |
| 4 | 8 | 12 | 16 | 20 | 16 | 12 | 8 | 4 |
| 5 | 10 | 15 | 20 | 25 | 20 | 15 | 10 | 5 |
| 4 | 8 | 12 | 16 | 20 | 16 | 12 | 8 | 4 |
| 3 | 6 | 9 | 12 | 15 | 12 | 9 | 6 | 3 |
| 2 | 4 | 6 | 8 | 10 | 8 | 6 | 4 | 2 |
| 1 | 2 | 3 | 4 | 5 | 4 | 3 | 2 | 1 |

FIG. 8

|  | X1 | X2 | X3 | X4 | X5 | X6 | X7 | X8 | X9 | X10 |
|---|---|---|---|---|---|---|---|---|---|---|
| n-th FRAME | 0.25 | 0.25 | 0.25 | 0.25 | 0.25 | 0.25 | 0.25 | 0.5 | 0.5 | 0.5 |
| (n+1)-th FRAME | 0.25 | 0.25 | 0.25 | 0.5 | 0.5 | 0.5 | 0.5 | 0.5 | 0.5 | 0.5 |

FIG. 12

| X1 | X2 | X3 | X4 | X5 | X6 | X7 | X8 | X9 | X10 |
|---|---|---|---|---|---|---|---|---|---|
| 0.26 | 0.28 | 0.31 | 0.35 | 0.4 | 0.44 | 0.47 | 0.49 | 0.5 | 0.5 |

FIG. 13

| X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|
| 0.255 | 0.26 | 0.27 | 0.28 | 0.295 | 0.31 | 0.33 | 0.35 | 0.375 | 0.4 | 0.42 | 0.44 | 0.455 | 0.47 | 0.48 | 0.49 | 0.495 | 0.5 | 0.5 | 0.5 |

| X1 | X2 | X3 | X4 | X5 | X6 | X7 | X8 | X9 | X10 |
|---|---|---|---|---|---|---|---|---|---|
| 0.375 | 0.375 | 0.375 | 0.375 | 0.5 | 0.5 | 0.5 | 0.5 | 0.5 | 0.5 |

FIG. 17

| X1 | X2 | X3 | X4 | X5 | X6 | X7 | X8 | X9 | X10 |
|---|---|---|---|---|---|---|---|---|---|
| 0.33 | 0.36 | 0.39 | 0.42 | 0.45 | 0.47 | 0.485 | 0.495 | 0.5 | 0.5 |

FIG. 18

| X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|
| 0.315 | 0.33 | 0.345 | 0.36 | 0.375 | 0.39 | 0.405 | 0.42 | 0.435 | 0.45 | 0.46 | 0.47 | 0.478 | 0.485 | 0.49 | 0.495 | 0.498 | 0.5 | 0.5 | 0.5 |

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| n-th FIRST-HALF SUB-FRAME | 0.25 | 0.25 | 0.25 | 0.25 | 0.25 | 0.25 | 0.25 | 0.24 | 0.23 | 0.22 | 0.21 | 0.19 | 0.17 | 0.15 | 0.12 | 0.6 | 0.58 | 0.56 | 0.55 | 0.53 |
| n-th SECOND-HALF SUB-FRAME | 0.26 | 0.27 | 0.28 | 0.29 | 0.3 | 0.32 | 0.33 | 0.35 | 0.36 | 0.38 | 0.39 | 0.41 | 0.42 | 0.44 | 0.45 | 0.46 | 0.47 | 0.48 | 0.49 |
| (n+1)-th FIRST-HALF SUB-FRAME | 0.23 | 0.22 | 0.21 | 0.19 | 0.17 | 0.15 | 0.12 | 0.6 | 0.58 | 0.56 | 0.55 | 0.53 | 0.52 | 0.51 | 0.5 | 0.5 | 0.5 | 0.5 | 0.5 | 0.5 |
| (n+1)-th SECOND-HALF SUB-FRAME | 0.35 | 0.36 | 0.38 | 0.39 | 0.41 | 0.42 | 0.44 | 0.45 | 0.46 | 0.47 | 0.48 | 0.49 | 0.49 | 0.5 | 0.5 | 0.5 | 0.5 | 0.5 | 0.5 | 0.5 |

FIG. 24

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| n-th FIRST-HALF FIRST SUB-FRAME | 0.25 | 0.25 | 0.25 | 0.25 | 0.25 | 0.25 | 0.25 | 0.24 | 0.23 | 0.22 | 0.21 | 0.19 | 0.17 | 0.15 | 0.12 | 0.6 | 0.58 | 0.56 | 0.55 | 0.53 |
| n-th FIRST-HALF SECOND SUB-FRAME | 0 | 0 | 0 | 0 | 0 | 0 | 0 | 0 | 0 | 0 | 0 | 0 | 0 | 0 | 0 | 0 | 0 | 0 | 0 | 0 |
| n-th SECOND-HALF FIRST SUB-FRAME | 0.26 | 0.27 | 0.28 | 0.29 | 0.3 | 0.32 | 0.33 | 0.35 | 0.36 | 0.38 | 0.39 | 0.41 | 0.42 | 0.44 | 0.45 | 0.46 | 0.47 | 0.48 | 0.49 |
| n-th SECOND-HALF SECOND SUB-FRAME | 0 | 0 | 0 | 0 | 0 | 0 | 0 | 0 | 0 | 0 | 0 | 0 | 0 | 0 | 0 | 0 | 0 | 0 | 0 | 0 |
| (n+1)-th FIRST-HALF FIRST SUB-FRAME | 0.23 | 0.22 | 0.21 | 0.19 | 0.17 | 0.15 | 0.12 | 0.6 | 0.58 | 0.56 | 0.55 | 0.53 | 0.52 | 0.51 | 0.51 | 0.5 | 0.5 | 0.5 | 0.5 | 0.5 |
| (n+1)-th FIRST-HALF SECOND SUB-FRAME | 0 | 0 | 0 | 0 | 0 | 0 | 0 | 0 | 0 | 0 | 0 | 0 | 0 | 0 | 0 | 0 | 0 | 0 | 0 | 0 |
| (n+1)-th SECOND-HALF FIRST SUB-FRAME | 0.35 | 0.36 | 0.38 | 0.39 | 0.41 | 0.42 | 0.44 | 0.45 | 0.46 | 0.47 | 0.48 | 0.49 | 0.49 | 0.5 | 0.5 | 0.5 | 0.5 | 0.5 | 0.5 | 0.5 |
| (n+1)-th SECOND-HALF SECOND SUB-FRAME | 0 | 0 | 0 | 0 | 0 | 0 | 0 | 0 | 0 | 0 | 0 | 0 | 0 | 0 | 0 | 0 | 0 | 0 | 0 | 0 |

FIG. 27

DISPLAY DEVICE

TECHNICAL FIELD

The disclosure described below relates to a display device.

BACKGROUND ART

In the related art, for example, when an input image of 60 Hz is displayed on a panel driven at an operating frequency of 120 Hz, which is twice as high as that of the input image, in order to improve the moving picture performance, various techniques have been devised. For example, there is a method in which one of sub-frames whose speed is doubled is set as a sub-frame in which the luminance of previous and subsequent frames is blurred, and the other of the sub-frames is set as a sub-frame that is emphasized in order to compensate for the luminance. Examples of such a method are disclosed in PTLs 1 to 3, for example.

CITATION LIST

Patent Literature

PTL 1: WO 2007/052441
PTL 2: JP 2009-034757 A
PTL 3: JP 2010-021180 A

SUMMARY

Technical Problem

In the techniques disclosed in PTLs 1 to 3, there is a problem in that the processing time becomes longer than necessary because the load of correction calculation is high.

An object of an aspect of the disclosure is to perform processing for improving the display quality of a moving picture in a shorter time period.

Solution to Problem

In order to solve the problem described above, a display device according to an aspect of the disclosure is a display device in which one frame is divided into a first-half sub-frame and a second-half sub-frame, and an image is displayed in each of the first-half sub-frame and the second-half sub-frame. The display device includes an emphasis processing unit configured to generate emphasized Y luminance data by performing luminance emphasis processing on only Y luminance data included in YUV data representing an image of one frame, a blur processing unit configured to generate blurred Y luminance data by performing luminance blur processing on only the Y luminance data, a first coupling unit configured to generate emphasized YUV data representing an image of the second-half sub-frame by coupling the emphasized Y luminance data with U color difference data and V color difference data included in the YUV data, and a second coupling unit configured to generate blurred YUV data representing the image of the second-half sub-frame by coupling the blurred Y luminance data with the U color difference data and the V color difference data.

Advantageous Effects of Disclosure

According to an aspect of the disclosure, the display quality of a moving picture can be further improved.

BRIEF DESCRIPTION OF DRAWINGS

FIG. 3 is a diagram illustrating names of luminance levels (pixel values) of pixels in images of two frames constituting input image data (moving picture) in the embodiment of the disclosure.

FIG. 4 is a diagram illustrating names of luminance levels of pixels in images of four sub-frames constituting output image data (moving picture) in the embodiment of the disclosure.

FIG. 5 is a diagram illustrating a filter for determining a luminance level of each pixel in a first-half sub-frame and a second-half sub-frame.

FIG. 7 is a diagram illustrating actual luminance levels of pixels in images of two sub-frames constituting display data after conversion in the embodiment of the disclosure.

FIG. 8 is a diagram illustrating a specific example of each filter value included in the filter in the embodiment of the disclosure.

FIG. 12 is a diagram illustrating luminance levels of a predetermined number of compressed pixels in an n-th frame and an (n+1)-th frame used to determine a luminance level of a pixel X in an n-th first-half sub-frame.

FIG. 13 is a diagram illustrating luminance levels of compressed pixels subjected to blur processing using the filter.

FIG. 15 is a diagram illustrating luminance levels of pixels after expansion.

FIG. 16 is a diagram illustrating an example of the luminance level of the first-half sub-frame luminance level in which an edge is emphasized.

FIG. 17 is a diagram illustrating an example of a compressed average luminance level.

FIG. 18 is a diagram illustrating an example of a blurred compressed luminance level.

FIG. 19 is a diagram illustrating an example of the luminance level of an n-th second-half sub-frame luminance level.

FIG. 20 is a diagram illustrating the luminance level of each pixel visually recognized by a user when an image is displayed without double-speed driving.

FIG. 21 is a diagram illustrating the luminance level of each pixel visually recognized by the user when an image is driven at double speed and displayed using a method according to the disclosure.

FIG. 23 is a diagram illustrating actual luminance levels of the pixels in the images of two sub-frames constituting the display data after conversion in a second embodiment of the disclosure.

FIG. 24 is a diagram illustrating actual luminance levels visually recognized by the user when a moving picture is displayed at 240 Hz in the second embodiment of the disclosure.

FIG. 27 is a diagram illustrating luminance levels of image data of 240 Hz converted in the modified example of the second embodiment according to the disclosure, and actual luminance levels visually recognized by the user when a moving picture is displayed at 240 Hz.

DESCRIPTION OF EMBODIMENTS

First Embodiment

Configuration of Display Device 1

Figure 1:
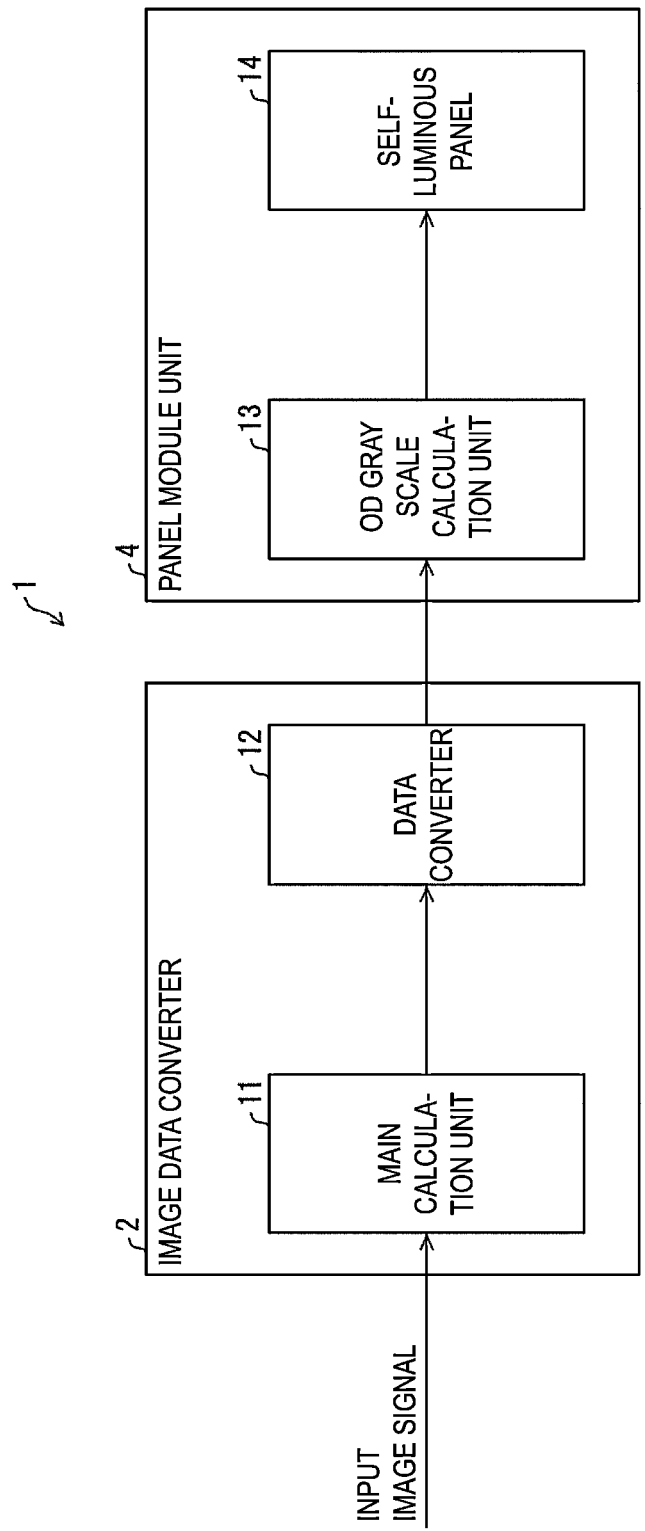
FIG. 1 is a block diagram illustrating a configuration of a display device according to an embodiment of the disclosure.

FIG. 1 is a block diagram illustrating a configuration of a display device 1 according to an embodiment of the disclosure. As illustrated in this drawing, the display device 1 includes an image data converter 2 and a panel module unit 4. The image data converter 2 includes a main calculation unit 11 and a data converter 12 (display data generation unit). The panel module unit 4 includes an overdrive (OD) gray scale calculation unit 13 (display processing unit) and a self-luminous panel 14.

The display device 1 is realized as various devices, such as PC monitors, television devices, and smartphones, having a function of displaying moving pictures. The self-luminous panel 14 is a self-luminous panel capable of displaying a moving picture at a high frame rate such as 120 Hz or 144 Hz, and with a high-speed response. Examples of the self-luminous panel 14 include an OLED panel and the like.

Configuration of Main Calculation Unit 11

Figure 2:
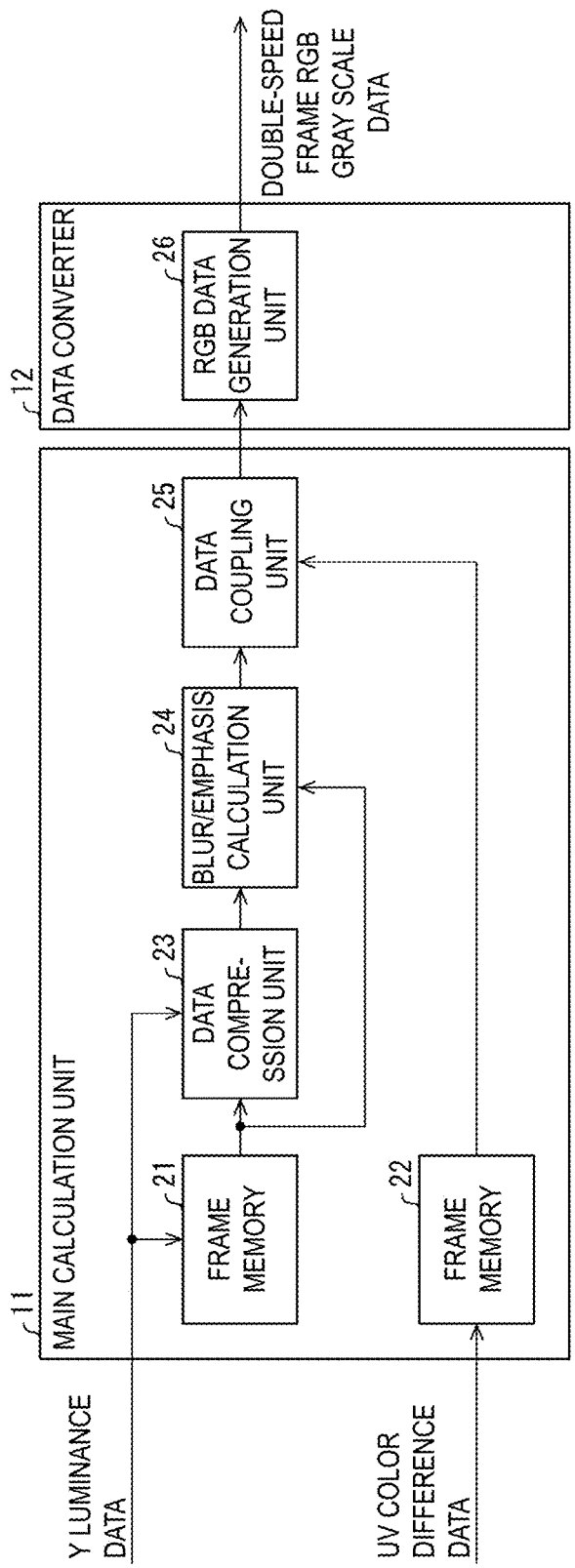
FIG. 2 is a diagram illustrating a detailed configuration of a main calculation unit and a data converter according to the embodiment of the disclosure.

FIG. 2 is a diagram illustrating a detailed configuration of the main calculation unit 11 and the data converter 12 according to the embodiment of the disclosure. As illustrated in this drawing, the main calculation unit 11 includes a frame memory 21, a frame memory 22, a data compression unit 23 (compression unit), a blur/emphasis calculation unit 24, and a data coupling unit 25. The data converter 12 includes an RGB data generation unit 26.

Luminance data in the YUV format is input to the main calculation unit 11 of the display device 1 as image data to be displayed. The main calculation unit 11 performs image processing on the input luminance data to generate double-speed frame YUV data to be displayed at a two-fold frequency or higher, and outputs the double-speed frame YUV data to the data converter 12. As will be described in detail later, the main calculation unit 11 applies image processing for improving the moving picture performance only to luminance data of a Y component from among the Y component, a U component, and a V component included in the YUV data. This is because a sufficient moving picture performance improvement effect can be obtained even if the same processing is not performed on the color difference components UV in consideration of the visual recognition characteristics of human eyes. In addition, when this method is adopted, since it is not necessary to apply the same processing to the U color difference data and the V color difference data, the processing time required for the image processing can be significantly reduced.

Definition of Terms

The display device 1 can display a moving picture on the self-luminous panel 14 by displaying individual images included in the moving picture on the self-luminous panel 14 for each of the corresponding frames. In the present embodiment, a frame at the present time (current frame) in the display device 1 is referred to as an n-th frame. Further, a frame immediately after the current frame (subsequent frame) is referred to as an (n+1)-th frame.

The display device 1 improves the moving picture display performance by driving the self-luminous panel 14 at double speed. Specifically, the display device 1 divides each frame for displaying a moving picture into two sub-frames and sequentially displays an image in each of the two sub-frames, thereby doubling the number of display frames of the moving picture. In this way, the display device 1 can convert a moving picture at a frame rate of 60 Hz to a moving picture at a frame rate of 120 Hz, and can display the converted moving picture on the self-luminous panel 14.

In the present embodiment, of two sub-frames obtained by dividing one frame, a sub-frame for firstly displaying an image in the same one frame is referred to as a first-half sub-frame. A sub-frame for subsequently displaying an image in the same frame is referred to as a second-half sub-frame. That is, the display device 1 divides one frame into the first-half sub-frame occupying the first-half of the one frame, and the second-half sub-frame occupying the second-half of the one frame.

In the present embodiment, two sub-frames obtained by dividing the n-th frame are referred to as an n-th first-half sub-frame and an n-th second-half sub-frame. Further, two sub-frames obtained by dividing the (n+1)-th frame are referred to as an (n+1)-th first-half sub-frame and an (n+1)-th second-half sub-frame.

FIG. 3 is a diagram illustrating names of luminance levels (pixel values) of pixels in images of two frames constituting input image data (moving picture) in the embodiment of the disclosure. FIG. 3 illustrates names of luminance levels of five pixels in the same L-th row (L is a natural number) included in the images of the two frames. X1 to X5 illustrated in FIG. 3 indicate positions of five consecutive pixels included in the L-th row of the image. To more generalize, in the present embodiment, the position of an i-th (i is a natural number) pixel included in the L-th row is referred to as Xi. That is, a "pixel Xi" in the present embodiment refers to the i-th pixel included in the L-th row in the image.

In FIG. 3, $I1(n)$ to $I5(n)$ indicate luminance levels of the five pixels X1 to X5, respectively, included in the L-th row in the image of the n-th frame. To generalize, in the present embodiment, the luminance level of the i-th pixel included in the L-th row in the image of the n-th frame is referred to as $Ii(n)$. To more generalize, in the present embodiment, the luminance level of the i-th pixel included in the L-th row in the image of a k-th frame (k is a natural number) is referred to as $Ii(k)$. Therefore, in FIG. 3, $I1(n+1)$ to $I5(n+1)$ indicate luminance levels of the five pixels X1 to X5, respectively, included in the L-th row in the image of the (n+1)-th frame.

FIG. 4 is a diagram illustrating names of luminance levels of pixels in images of four sub-frames constituting output image data (moving picture) in the embodiment of the disclosure. FIG. 4 illustrates names of luminance levels of five pixels included in the L-th row of images of four sub-frames obtained by dividing each of two frames.

In FIG. 4, F1(n) to F5(n) indicate luminance levels of the five pixels X1 to X5, respectively, included in the L-th row in the image of the n-th first-half sub-frame. To generalize, in the present embodiment, the luminance level of the i-th pixel included in the L-th row in the image of the n-th first-half sub-frame is referred to as Fi(n). To more generalize, in the present embodiment, the luminance level of the i-th pixel included in the L-th row in the image of a first-half sub-frame obtained by dividing the k-th frame is referred to as Ii(k). Therefore, in FIG. 4, F1(n+1) to F5(n+1) indicate luminance levels of the five pixels X1 to X5, respectively, included in the L-th row in the image of the (n+1)-th first-half sub-frame.

In FIG. 4, S1(n) to S5(n) indicate luminance levels of the five pixels X1 to X5, respectively, included in the L-th row in the image of the n-th second-half sub-frame. To generalize, in the present embodiment, the luminance level of the i-th pixel included in the L-th row in the image of the n-th second-half sub-frame is referred to as Si(n). To more generalize, in the present embodiment, the luminance level of the i-th pixel included in the L-th row in the image of a second-half sub-frame obtained by dividing the k-th frame is referred to as Si(k). Therefore, in FIG. 4, S1(n+1) to S5(n+1) indicate luminance levels of the five pixels X1 to X5, respectively, included in the L-th row in the image of the (n+1)-th second-half sub-frame.

The image data converter 2 converts the image of each frame included in the input image data to an image of the first-half sub-frame and an image of a second-half sub-frame. At this time, the image data converter 2 converts the luminance level of the pixel Xi included in the image of the k-th frame to a luminance level Fi(k) of the pixel Xi of the k-th first-half sub-frame and a luminance level Si(k) of the pixel Xi of the k-th second-half sub-frame. For example, the image data converter 2 converts a luminance level I5(n) of the pixel X5 included in the image of the n-th frame to a luminance level F5(n) of the pixel X5 included in the image of the n-th first-half sub-frame and a luminance level S5(n) of the pixel X5 included in the image of the n-th second-half sub-frame. Further, the image data converter 2 converts a luminance level I3(n+1) of the pixel X3 included in the image of the (n+1)-th frame to a luminance level F3(n+1) of the pixel X3 included in the image of the (n+1)-th first-half sub-frame and a luminance level S3(n+1) of the pixel X5 included in the image of the (n+1)-th second-half sub-frame.

FIG. 5 is a diagram illustrating a filter 31 for determining a luminance level of each pixel in the first-half sub-frame and the second-half sub-frame. The image data converter 2 uses the filter 31 illustrated in FIG. 5 when determining the luminance level of each pixel of the first-half sub-frame. The filter 31 is a planar filter having a plurality of filter values (first filter values) arranged two-dimensionally. In FIG. 5, the filter 31 has a total of 81 filter values arranged in a square shape of nine rows and nine columns. In FIG. 5, a filter value arranged at a position of an x-th row and a y-th column (x and y are each an integer equal to or greater than 1 and equal to or less than 9) of the filter 31 is referred to as Axy. Therefore, A11 is a filter value arranged at a position of the first row and the first column of the filter 31, and A55 is a filter value arranged at a position of the fifth row and the fifth column of the filter 31.

Specific Example of Luminance Level of Image

Figure 6:
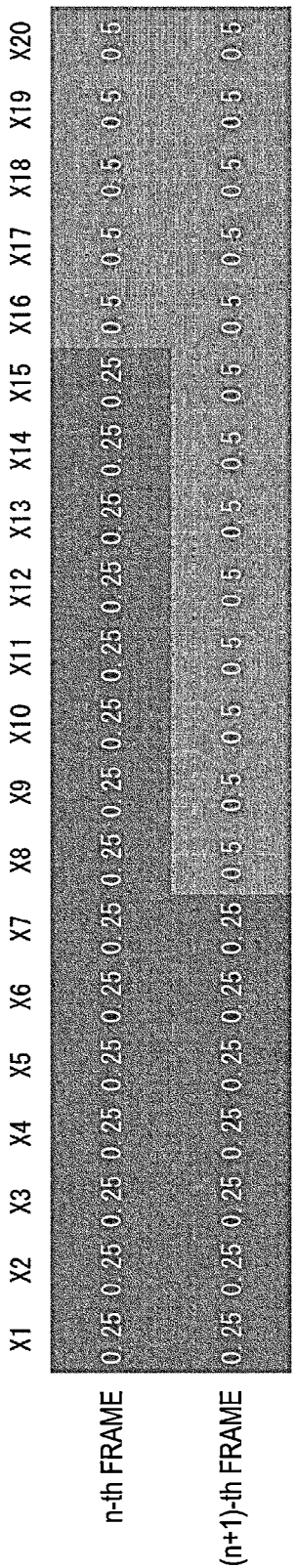
FIG. 6 is a diagram illustrating actual luminance levels of the pixels in the images of two frames constituting the input image data (moving picture) in the embodiment of the disclosure.

FIG. 6 is a diagram illustrating actual luminance levels of the pixels in the images of two frames constituting the input image data (moving picture) in the embodiment of the disclosure. Hereinafter, an example in which the image data converter 2 processes an image having each of the luminance levels illustrated in FIG. 6 will be described. The image includes an edge at a predetermined position in the row direction of the image. The edge is a portion where a first region in which the same first luminance level continues and a second region in which a second luminance level different from the first luminance level continues are in contact with each other in the image.

In the example of FIG. 6, there is an edge between a region where the luminance level 0.25 continues and a region where the luminance level 0.5 continues in the image. For example, in the image of the n-th frame, an edge is present between a pixel X15 and a pixel X16. Further, in the image of the subsequent (n+1)-th frame, there is an edge between a pixel X7 and a pixel X8. That is, when each of the images illustrated in FIG. 6 is displayed at a frame rate of 60 Hz as it is, the edge present in the L-th row is displayed in such a manner as to move by eight pixels from the right to the left for each frame on the screen of the self-luminous panel 14.

FIG. 7 is a diagram illustrating actual luminance levels of pixels in images of four sub-frames constituting display data after conversion in the embodiment of the disclosure. The image data converter 2 converts the image of each of the frames illustrated in FIG. 6 to the image of each sub-frame illustrated in FIG. 7. For example, the image data converter 2 converts the luminance level "0.5" of the pixel X16 of the n-th frame to the luminance level "0.6" of the pixel X16 of the n-th first-half sub-frame and the luminance level "0.45" of the pixel X16 of the n-th second-half sub-frame. Details of the conversion procedure will be described below.

Specific Example of Filter Value

FIG. 8 is a diagram illustrating a specific example of each filter value included in the filter 31 in the embodiment of the disclosure. In the present embodiment, the image data converter 2 uses the filter 31 illustrated in FIG. 8 when determining the luminance level of each pixel of the n-th first-half sub-frame. In the filter 31, filter values A11, A21, . . . , A91 are 1, 2, 3, 4, 5, 4, 3, 2, and 1, respectively. Filter values A12, A22, . . . , A92 are values obtained by multiplying the filter values A11, A21, . . . , A91 by two. Filter values A13, A23, . . . , A93 are values obtained by multiplying the filter values A11, A21, . . . , A91 by three. Filter values A14, A24, . . . , A94 are values obtained by multiplying the filter values A11, A21, . . . , A91 by four. Filter values A15, A25, . . . , A95 are values obtained by multiplying the filter values A11, A21, . . . , A91 by five. Filter values A16, A26, . . . , A96 are values obtained by multiplying the filter values A11, A21, . . . , A91 by four. Filter values A17, A27, . . . , A97 are values obtained by multiplying the filter values A11, A21, . . . , A91 by three. Filter values A18, A28, . . . , A98 are values obtained by multiplying the filter values A11, A21, . . . , A91 by two. Filter values A19, A29, . . . , A99 are the same values as the filter values A11, A21, . . . , A91. As described above, in the filter 31, the filter value tends to become larger toward the center of the filter 31, and the filter value tends to become smaller toward a corner of the filter.

Flow of Processing

Hereinafter, a flow of a series of processing when the display device 1 displays a moving picture will be described, particularly focusing on conversion processing by the image data converter 2. Hereinafter, an example will be described in which the display device 1 converts the image of the n-th frame to the image of the n-th first-half sub-frame and the image of the n-th second-half sub-frame, and displays the images in order on the self-luminous panel 14.

In the display device 1, a moving picture to be displayed is input to the image data converter 2 as an input image signal. The value of each pixel included in the input image signal is defined as a normalized luminance level. The luminance level takes any value in the range from 0 to 1. The value 0 corresponds to the darkest color (black) in the image, and the value 1 corresponds to the brightest color (white) in the image.

As illustrated in FIG. 2, YUV data is input to the main calculation unit 11. At this time, the Y luminance data, the U color difference data, and the V color difference data are input to the main calculation unit 11 in a state of being separated from each other. When the Y luminance data of the n-th frame is input, the main calculation unit 11 outputs the data to the data compression unit 23. Further, the Y luminance data of an (n−1)-th frame, which is already stored in the n-th frame at this point in time, is read from the frame memory 21 and output to the data compression unit 23. Then, the input Y luminance data of the n-th frame is stored in the frame memory 21.

When the UV color difference data of the n-th frame is further input, the main calculation unit 11 reads, from the frame memory 22, the UV color difference data of the (n−1)-th frame, which is already stored in the frame memory 22 at this point in time, and outputs the UV color difference data of the (n−1)-th frame to the data coupling unit. Then, the input UV color difference data of the n-th frame is stored in the frame memory 22.

The input of the YUV data of the (n+1)-th frame triggers the main calculation unit 11 to perform image processing on the Y luminance data of the n-th frame. When the Y luminance data of the n-th frame is input, the main calculation unit 11 outputs the data to the data compression unit 23. Further, the Y luminance data of the n-th frame, which is already stored in the frame memory 21 at this point in time, is read from the frame memory 21 and output to the data compression unit 23. Then, the input Y luminance data of the (n+1)-th frame is stored in the frame memory 21.

When the UV color difference data of the (n+1)-th frame is further input, the main calculation unit 11 reads, from the frame memory 22, the UV color difference data of the n-th frame, which is already stored in the frame memory 22 at this point in time, and outputs the UV color difference data of the n-th frame to the data coupling unit. Then, the input UV color difference data of the (n+1)-th frame is stored in the frame memory 22. Hereinafter, an example will be described in which the image data converter 2 converts a luminance level $I12(n)$ of a pixel X12 in the n-th frame to a luminance level $F12(n)$ of the pixel X12 in the n-th first-half sub-frame, and to a luminance level $S12(n)$ of the pixel X12 in the n-th second-half sub-frame.

Figure 9:
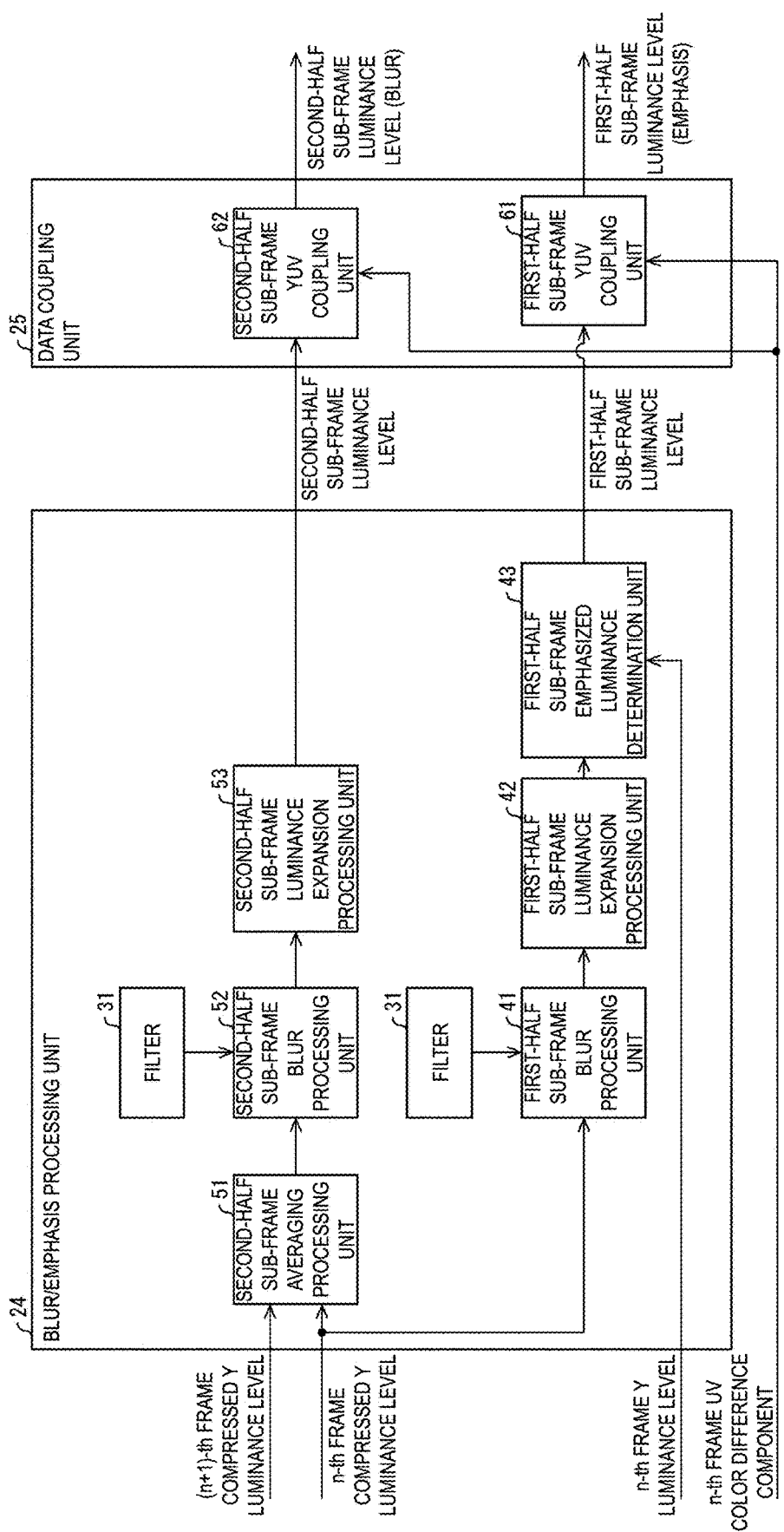
FIG. 9 is a diagram for describing compression processing performed by a data compression unit.

FIG. 9 is a diagram illustrating a detailed configuration of the blur/emphasis calculation unit 24 and the data coupling unit 25. As illustrated in this drawing, the blur/emphasis calculation unit 24 (an emphasis processing unit and a blur processing unit) includes a first-half sub-frame blur processing unit 41, a first-half sub-frame luminance expansion processing unit 42, a first-half sub-frame emphasized luminance determination unit 43, a second-half sub-frame luminance averaging processing unit 51, a second-half sub-frame blur processing unit 52, and a second-half sub-frame luminance expansion processing unit 53. The data coupling unit 25 includes a first-half sub-frame YUV coupling unit 61 (a first coupling unit) and a second-half sub-frame YUV coupling unit 62 (a second coupling unit).

Compression Processing

Figure 10:
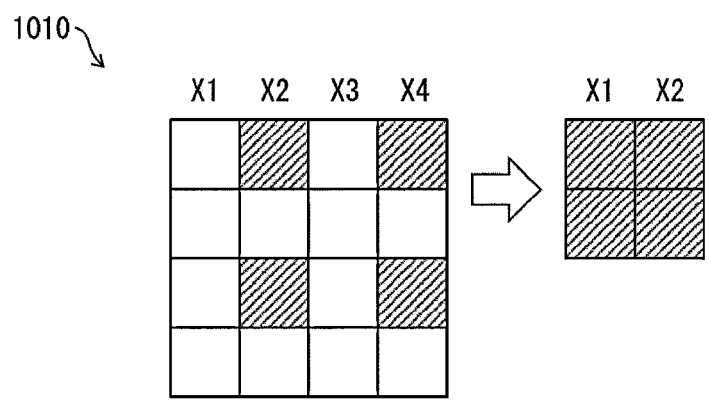
FIG. 10 is a diagram illustrating a detailed configuration of a blur/emphasis calculation unit and a data coupling unit.
Figure 10:
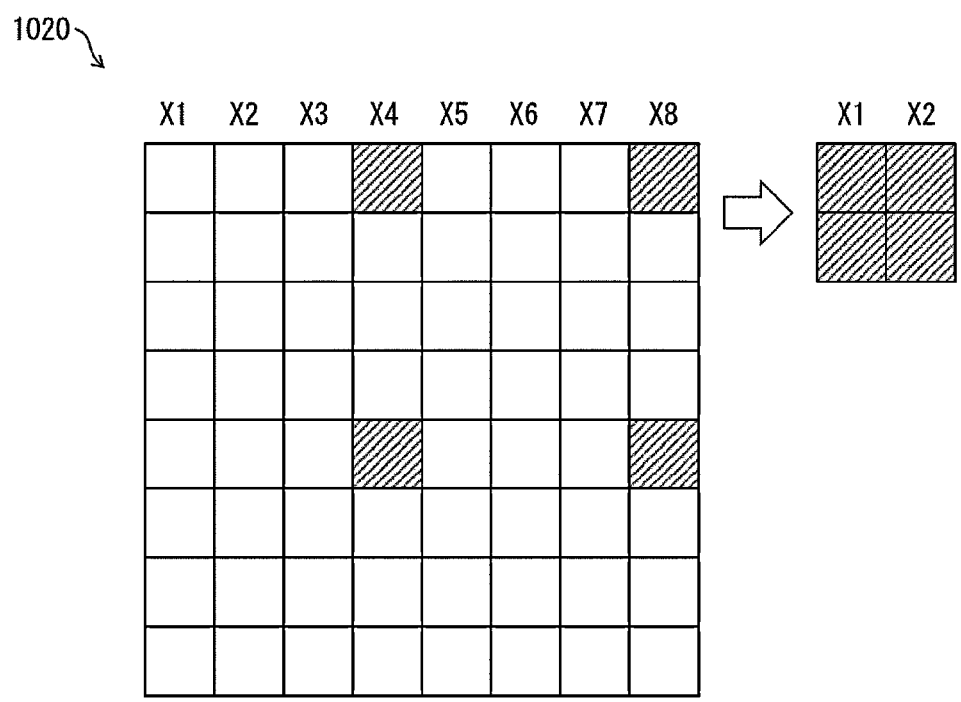

FIG. 10 is a diagram illustrating compression processing performed by the data compression unit 23. The data compression unit 23 generates compressed Y luminance data by performing luminance compression processing on the Y luminance data. A reference numeral 1010 in FIG. 10 indicates an example in which the luminance level is compressed to ½, and a reference numeral 1020 in FIG. 10 indicates an example in which the luminance level is compressed to ¼.

In the example indicated by the reference numeral 1010 in FIG. 10, the data compression unit 23 compresses the number of luminance levels of each pixel, included in the Y luminance data and arranged in a planar manner, to ½ in each of the vertical and horizontal directions. In this way, the size of the Y luminance data can be reduced to ¼. More specifically, the data compression unit 23 compresses the luminance level of a pixel group including 2×2=4 pixels to one luminance level. For example, among the luminance level of X1 included in the L-th row, the luminance level of X2 included in the L-th row, the luminance level of X1 included in an L+1-th row, and the luminance level of X2 included in the L-th row, only the luminance level of X2 included in the L-th row is left, and the rest are thinned out and deleted.

In the example indicated by the reference numeral 1020 in FIG. 10, the data compression unit 23 compresses the number of luminance levels of each pixel, included in the Y luminance data and arranged in a planar manner, to ¼ in each of the vertical and horizontal directions. In this way, the size of the Y luminance data can be reduced to ¹⁄₁₆. More specifically, the data compression unit 23 compresses the luminance level of a pixel group including 4×4=16 pixels to one luminance level. For example, among the luminance levels of X1 to X4 included in the L-th row to an L+3-th row (16 luminance levels in total), only the luminance level of X4 included in the L-th row is left, and the rest are thinned out and deleted.

The data compression unit 23 compresses both the input Y luminance data of the n-th frame and the input Y luminance data of the (n+1)-th frame. The compressed Y luminance data of the n-th frame generated in this manner is output to the blur/emphasis calculation unit 24.

Figure 11:
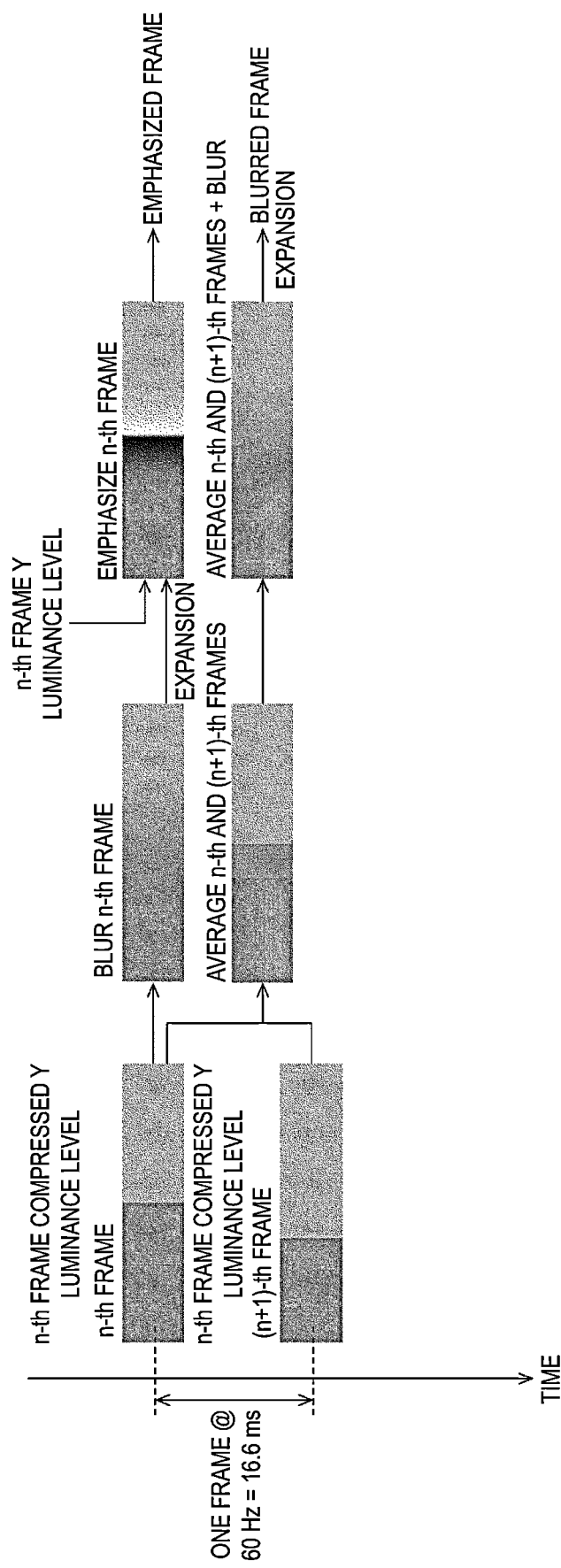
FIG. 11 is a diagram for describing a procedure of each processing performed by the blur/emphasis calculation unit.

FIG. 11 is a diagram for describing a procedure of each processing performed by the blur/emphasis calculation unit 24. FIG. 12 is a diagram illustrating luminance levels of a predetermined number of compressed pixels in the n-th frame and the (n+1)-th frame used to determine the luminance level of the pixel X16 of the n-th first-half sub-frame. Hereinafter, an example in which the blur/emphasis calculation unit 24 specifies a compressed pixel X6 as a pixel of interest to be processed will be described. When the compressed pixel X6 is specified, the blur/emphasis calculation unit 24 specifies, as peripheral pixels (first peripheral pixels) of the compressed pixel X6, a plurality of pixels each of which is superimposed on the periphery, in the row direction, of the filter 31 when the compressed pixel X6 is superimposed on the center A55 of the filter 31 in the L-th row of the compressed image in the n-th frame. Here, compressed pixels X2 to X5 and compressed pixels X7 to X10 are specified as the peripheral pixels (first peripheral pixels) of the compressed pixel X6.

Blur Processing by Filter Application

FIG. 13 is a diagram illustrating luminance levels of compressed pixels subjected to blur processing using the filter 31. The first-half sub-frame blur processing unit 41 performs calculation, using the filter 31, for each of luminance levels Iz2(n) to Iz10(n) of the compressed pixel X6 of interest and of each of the compressed peripheral pixels X2 to X5 and X7 to X10. First, the first-half sub-frame blur processing unit 41 individually multiplies each of Iz2(n) to Iz10(n) by the filter values A15, A25, . . . , A95 respectively superimposed on the compressed pixels X2 to X10 in the filter 31, to calculate values D1 to D9.

$$D1 = Iz2(n) \times A15 = 0.25 \times 5 = 1.25$$
$$D2 = Iz3(n) \times A25 = 0.25 \times 10 = 2.5$$
$$D3 = Iz4(n) \times A35 = 0.25 \times 15 = 3.75$$
$$D4 = Iz5(n) \times A45 = 0.25 \times 20 = 5$$
$$D5 = Iz6(n) \times A55 = 0.25 \times 25 = 6.75$$
$$D6 = Iz7(n) \times A65 = 0.25 \times 20 = 3.75$$
$$D7 = Iz8(n) \times A75 = 0.5 \times 15 = 7.5$$
$$D8 = Iz9(n) \times A85 = 0.5 \times 10 = 5$$
$$D9 = Iz10(n) \times A95 = 0.5 \times 5 = 2.5$$

Subsequently, the first-half sub-frame blur processing unit 41 calculates a total sum Dsum of the obtained values D1 to D9. Finally, the first-half sub-frame blur processing unit 41 determines a first-half sub-frame coefficient (first coefficient) Pf based on the total sum Dsum and a predetermined threshold value Th. Here, the threshold value Th is the sum of A15, A25, . . . , A95, that is, 125. The first-half sub-frame blur processing unit 41 determines a compressed blurred luminance level Bz12(n)=0.44, by dividing the total sum Dsum by the threshold value Th.

Expansion Processing

The first-half sub-frame blur processing unit 41 performs the same processing on the individual compressed pixels X1 to X10 included in the compressed Y luminance data to generate compressed blurred Y luminance data including the compressed blurred luminance level of each of the compressed pixels, and outputs the compressed blurred Y luminance data to the first-half sub-frame luminance expansion processing unit 42. The first-half sub-frame luminance expansion processing unit 42 generates an n-th frame blurred luminance level by performing predetermined expansion processing on each of the compressed blurred luminance levels included in the compressed blurred Y luminance data.

Figure 14:
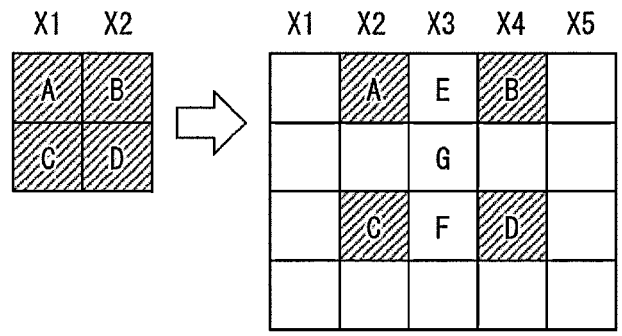
FIG. 14 is a diagram describing compression processing.
Figure 14:
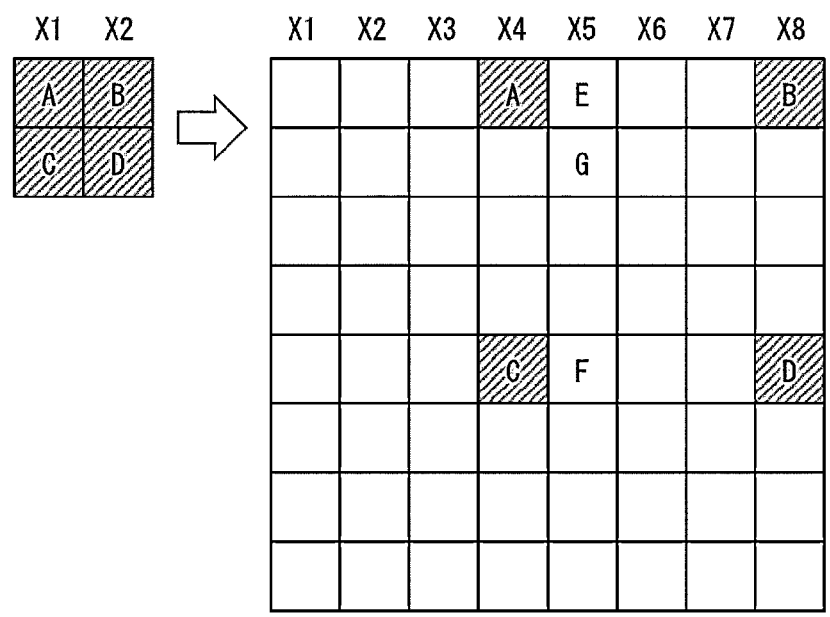

FIG. 14 is a diagram describing the expansion processing. A reference numeral 1110 in FIG. 14 indicates an example in which pixels compressed to ½ in each of the vertical and horizontal directions are expanded to original pixels, and a reference numeral 1120 in FIG. 14 indicates an example in which pixels compressed to ¼ in each of the vertical and horizontal directions are expanded to original pixels. In the example indicated by the reference numeral 1110 in FIG. 14, 2×2 compressed pixels are expanded to 4×4 original pixels, and in the example indicated by the reference numeral 1120 in FIG. 14, 2×2 compressed pixels are expanded to 8×8 original pixels. The first-half sub-frame luminance expansion processing unit 42 determines each luminance level of the compressed pixel, as a luminance level of a pixel corresponding to that compressed pixel in an image after expansion.

For example, in the example indicated by the reference numeral 1110 in FIG. 14, the first-half sub-frame luminance expansion processing unit 42 determines the luminance level A of the compressed pixel X1 in the L-th row, as the luminance level A of the pixel X2 corresponding to the compressed pixel X1 in the L-th row. Similarly, the luminance level A of the compressed pixel X2 in the L-th row is determined to be the luminance level B of the pixel X4 corresponding to the compressed pixel X2 in the L-th row. Further, the luminance level E of the pixel X3 between the pixel X2 and the pixel X4 is determined using the luminance level A and the luminance level B after expansion. Specifically, an average value of the luminance level A and the luminance level B is set as the luminance level E of the pixel X3. In other words, luminance level E=(luminance level A+luminance level B)÷2. In this manner, the luminance level of each of the pixels, which have been thinned out and deleted at the time of compression processing, is determined by interpolation processing.

In the example indicated by the reference numeral 1110 in FIG. 14, the first-half sub-frame luminance expansion processing unit 42 determines the luminance level A of the compressed pixel X1 in the L-th row, as the luminance level A of the pixel X4 corresponding to the compressed pixel X1 in the L-th row. Similarly, the luminance level A of the compressed pixel X2 in the L-th row is determined to be the luminance level B of the pixel X8 corresponding to the compressed pixel X2 in the L-th row.

FIG. 15 is a diagram illustrating luminance levels of the pixels X1 to X20 after expansion. The first-half sub-frame luminance expansion processing unit 42 determines the n-th frame blurred luminance levels illustrated in FIG. 15 by expanding the n-th frame blurred compressed luminance levels illustrated in FIG. 14, respectively. The first-half sub-frame luminance expansion processing unit 42 generates blurred Y luminance data including the determined Bzi(n), and outputs the blurred Y luminance data to the first-half sub-frame emphasized luminance determination unit 43.

Figure 16:
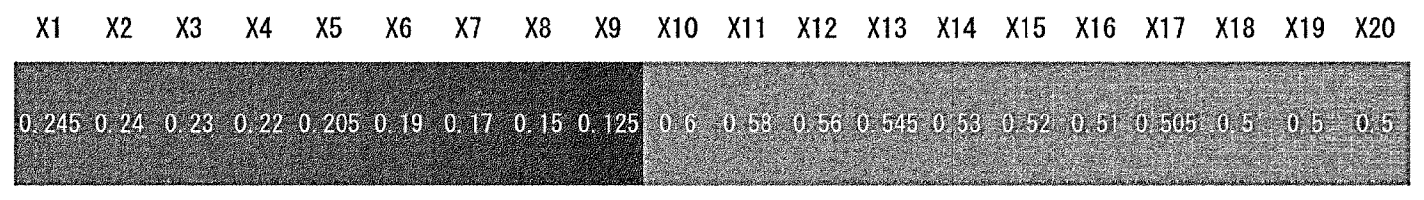

FIG. 16 is a diagram illustrating an example of a first-half sub-frame luminance level F (n) in which the edge is emphasized. The first-half sub-frame emphasized luminance determination unit 43 calculates a difference between Bzi(n) included in the blurred Y luminance data and the n-th frame luminance level I(n−1) before compression. The first-half sub-frame emphasized luminance determination unit 43 further adds the calculated difference to I(n−1) to calculate the first-half sub-frame luminance level Fi(n) in which the edge is emphasized. Fi(n) illustrated in FIG. 16 is a result determined using Bzi(n) illustrated in FIG. 15. The first-half sub-frame emphasized luminance determination unit 43 performs such luminance emphasis processing on the blurred Y luminance data to generate emphasized Y luminance data including Fi(n) of each pixel, and outputs the emphasized Y luminance data to the first-half sub-frame YUV coupling unit 61.

Determination of Second-half Sub-frame Luminance Level

In addition to the processing of determining the first-half sub-frame luminance level Fi(n), the blur/emphasis calculation unit 24 also performs processing of determining a second-half sub-frame luminance level Si(n). These processing operations may be performed simultaneously or one after the other.

FIG. 17 is a diagram illustrating an example of a compressed average luminance level Azi. The second-half sub-frame luminance averaging processing unit 51 calculates the compressed average luminance level Azi, which is an average of the compressed luminance level Izi(n) of the n-th frame and the compressed luminance level Izi (n+1) of the (n+1)-th frame. The value of Azi illustrated in FIG. 17 is an average value of Izi(n) and Izi (n+1) illustrated in FIG. 12. The second-half sub-frame luminance averaging processing unit 51 outputs the average compressed Y luminance data including the calculated Azi to the second-half sub-frame blur processing unit 52.

FIG. 18 is a diagram illustrating an example of a blurred compressed luminance level Azi(n). The second-half sub-frame blur processing unit 52 determines the blurred compressed luminance level Azi(n) by applying the filter 31 to each Azi included in the input average compressed Y luminance data. Since the method of applying the filter 31 is not different from that described above, a detailed description thereof is omitted. The second-half sub-frame blur processing unit 52 generates blurred Y luminance data for emphasis including the calculated Azi(n), and outputs the blurred Y luminance data to the second-half sub-frame luminance expansion processing unit 53.

FIG. 19 is a diagram illustrating an example of the n-th second-half sub-frame luminance level Si(n). The second-half sub-frame luminance expansion processing unit 53 determines the n-th second-half sub-frame luminance level Si(n) by expanding the input Azi(n). Since the expansion method is the same as that described above, a detailed description thereof is omitted. Si(n) illustrated in FIG. 19 is a result of expanding Azi(n) illustrated in FIG. 18.

The first-half sub-frame emphasized luminance determination unit 43 generates emphasized Y luminance data including the determined Fi(n), and outputs the emphasized Y luminance data to the first-half sub-frame YUV coupling unit 61. The UV color difference data of the n-th frame stored in the frame memory 22 is also input to the first-half sub-frame YUV coupling unit 61. The first-half sub-frame YUV coupling unit 61 couples the emphasized Y luminance data with the U color difference data and the V color difference data of the n-th frame, to generate the emphasized YUV data including Fi(n) of each pixel. The emphasized luminance data is YUV format data representing an image for the first-half sub-frame. The first-half sub-frame YUV coupling unit 61 outputs the generated emphasized YUV data to the data converter 12.

The second-half sub-frame luminance expansion processing unit 53 generates blurred Y luminance data including the determined Si(n), and outputs the blurred Y luminance data to the second-half sub-frame YUV coupling unit 62. The UV color difference data of the n-th frame stored in the frame memory 22 is also input to the second-half sub-frame YUV coupling unit 62. The second-half sub-frame YUV coupling unit 62 couples the blurred Y luminance data with the U color difference data and the V color difference data of the n-th frame, to generate blurred YUV data including Si(n) of each pixel. The second-half sub-frame YUV coupling unit 62 outputs the generated blur YUV data to the data converter 12.

The RGB data generation unit 26 of the data converter 12 converts the input emphasized YUV data and blurred YUV data to corresponding RGB gray scale data. In this way, a first-half sub-frame RGB gray scale signal and a second-half sub-frame RGB gray scale signal are obtained. The data converter 12 outputs these gray scale signals to the OD gray scale calculation unit 13.

The OD gray scale calculation unit 13 performs overdrive processing on the input RGB gray scale signals as necessary. In this way, it is possible to sufficiently brighten a region having insufficient luminance in the image. The OD gray scale calculation unit 13 outputs the processed RGB gray scale signals to the self-luminous panel 14. The self-luminous panel 14 reproduces a moving picture at double speed, that is, at 120 Hz using the input RGB gray scale signals.

Moving-Picture Blur Waveform

Figure 20:
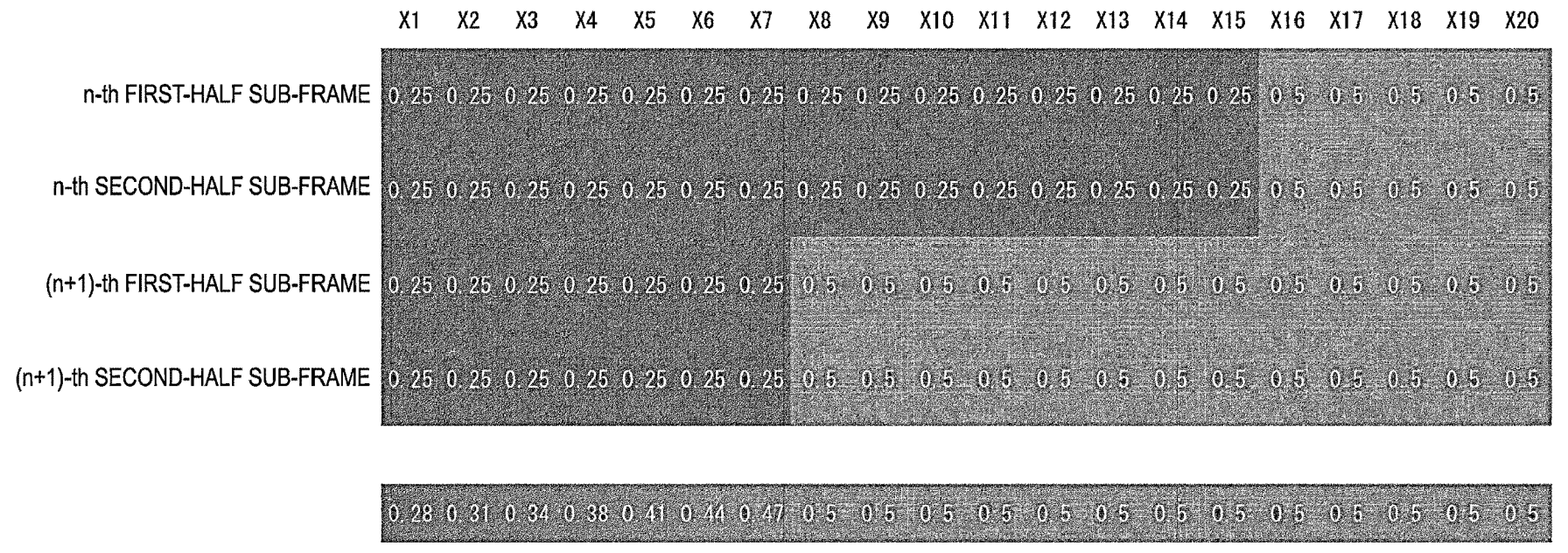

FIG. 20 is a diagram illustrating the luminance level of each pixel visually recognized by the user when an image is displayed without double-speed driving. When an edge included in the image is displayed while moving in the left direction of the screen as illustrated in FIG. 20, the eyes of the user visually recognize the image in such a manner as to chase the movement of the edge in each frame. At this time, the user sequentially follows and visually recognizes the luminance level of each pixel at the movement destination of the line of sight, and finally visually recognizes an integrated value (average value) of the luminance levels having been visually recognized, as the actual luminance level. In FIG. 20, the moving speed of the edge is equivalent to four pixels per sub-frame. Therefore, for example, the user visually recognizes the luminance levels of four pixels X12 to X15 in the (n+1)-th first-half sub-frame, and visually recognizes the luminance levels of four pixels X8 to X11 in the subsequent (n+1)-th second-half sub-frame, the four pixels X8 to X11 being located to the left of the four pixels X12 to X15. Then, the user visually recognizes the average value of these 8 luminance levels as the actual luminance level of the pixel X8. As a result, the user visually recognizes 0.5 as the luminance level of the pixel X8. As a result of following the line of sight of the user as discussed above, a blur of the image appears at the position of the edge visually recognized by the user. This phenomenon is called a moving-picture blur.

Figure 21:
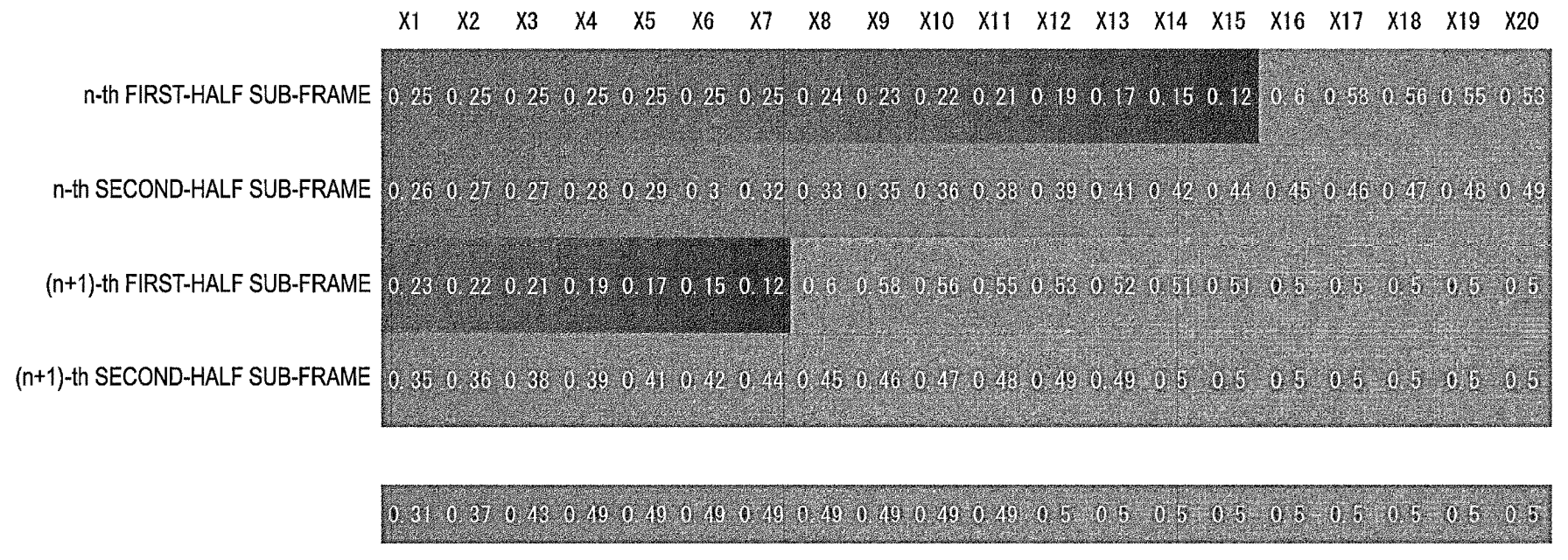

FIG. 21 is a diagram illustrating the luminance level of each pixel visually recognized by the user when an image is driven at double speed and displayed using a method according to the disclosure. In FIG. 21, the moving speed of the edge is equivalent to four pixels per sub-frame. Therefore, for example, the user visually recognizes the luminance levels of four pixels X12 to X15 in the (n+1)-th first-half sub-frame, and visually recognizes the luminance levels of four pixels X8 to X11 in the subsequent (n+1)-th second-half sub-frame. Then, the user visually recognizes the average value of these 8 luminance levels as the actual luminance level of the pixel X8. As a result, the user visually recognizes 0.49 as the luminance level of the pixel X8.

Figure 22:
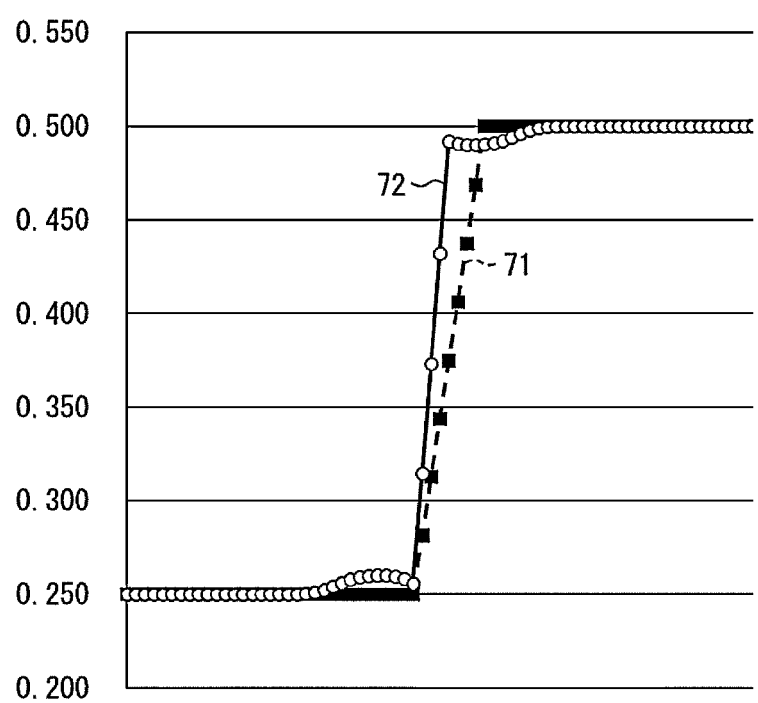
FIG. 22 is a diagram illustrating a moving-picture blur waveform visually recognized by the user.

FIG. 22 is a diagram illustrating a moving-picture blur waveform visually recognized by the user. A graph 71 is a graph showing a distribution of actual luminance levels visually recognized by the user when a moving picture is displayed at 60 Hz as illustrated in FIG. 20. A graph 72 is a graph showing a distribution of actual luminance levels visually recognized by the user when a moving picture is driven at double speed and displayed at 120 Hz as illustrated in FIG. 21. In FIG. 22, the horizontal axis represents the position of each pixel in the L-th row of the image, and the vertical axis represents the luminance level actually recognized by the user.

The graph 71 corresponds to a moving-picture blur waveform when the moving picture is displayed at 60 Hz, and the graph 72 corresponds to a moving-picture blur waveform when the moving picture is driven at double speed and displayed at 120 Hz using a method according to the disclosure. As illustrated in FIG. 22, the width of the edge of the luminance levels included in the graph 72 is smaller than the width of the edge of the luminance levels included in the graph 71. Since the display device 1 can suppress the degree of the moving-picture blur occurring at the edge when the moving picture is displayed at 120 Hz in this manner, the display quality of the moving picture can be improved.

The display device 1 applies the processing for improving the quality of the moving picture only to the Y luminance data of the YUV data. That is, unlike the Y luminance data, the UV color difference data is not subjected to the processing for improving the quality of the moving picture. In this way, the number of steps required for the processing can be reduced to one third as compared with a technique of the related art in which the processing for improving the quality of the moving picture is performed on RBG luminance data. As a result, the processing for improving the display quality of the moving picture can be performed in a shorter time period.

Further, the display device 1 compresses the Y luminance data of the image, and also applies the blur processing using the filter 31 to the compressed Y luminance data. As a result, the number of pixels to be processed can be significantly reduced as compared with a case where the filter 31 is directly applied to the Y luminance data that is not compressed, and thus the time required to complete the processing can be further reduced.

Second Embodiment

FIG. 23 is a diagram illustrating actual luminance levels of the pixels in the images of the four sub-frames constituting the display data after conversion in a second embodiment of the disclosure. In the present embodiment, the display device 1 displays at a speed that is four times faster, that is, at 240 Hz, using the display data of the luminance levels illustrated in FIG. 23. The display data illustrated in FIG. 23 is the same as the display data illustrated in FIG. 6 in the first embodiment.

Figure 24:
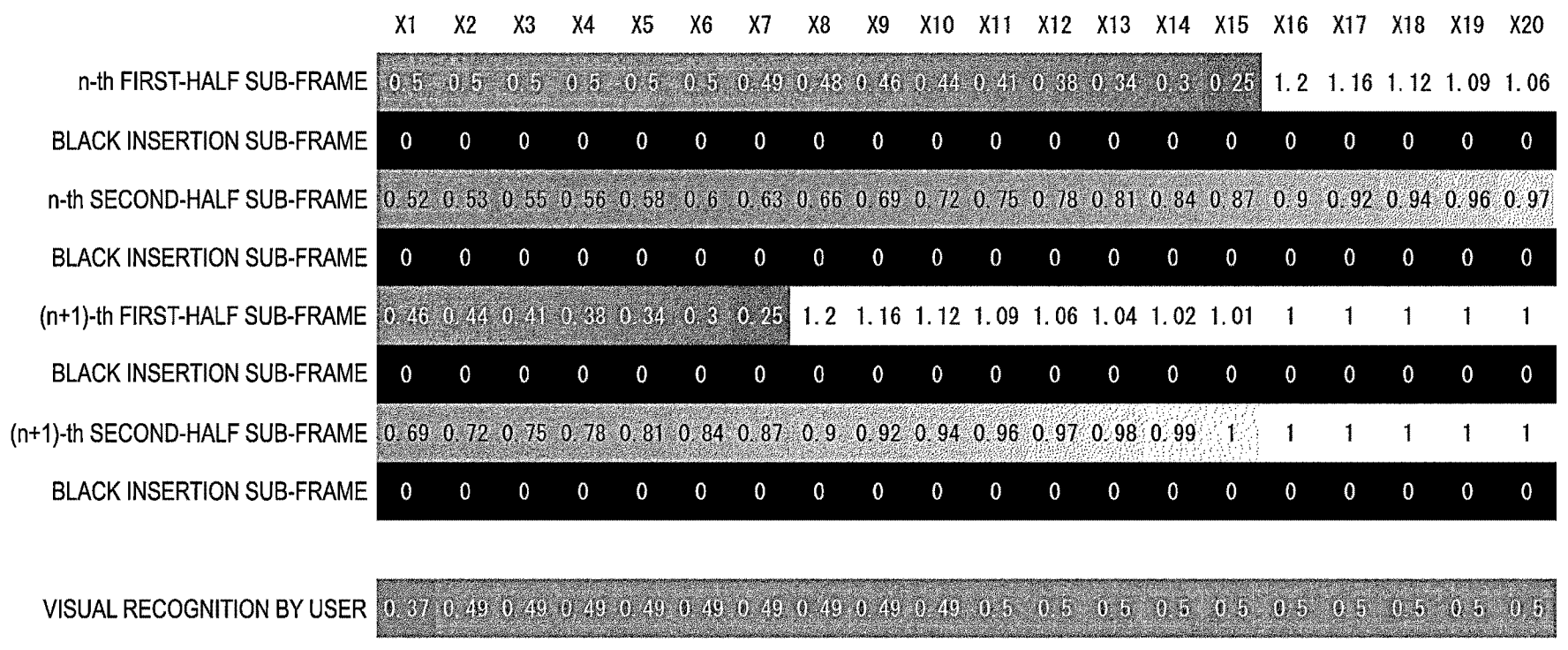

FIG. 24 is a diagram illustrating actual luminance levels visually recognized by the user when a moving picture is displayed at 240 Hz in the second embodiment of the disclosure. In the present embodiment, when the display device 1 outputs the display data of 120 Hz illustrated in FIG. 23 to the self-luminous panel 14, the length of each of the first-half sub-frame and the second-half sub-frame is reduced to half, and a black insertion sub-frame for black display is added after each sub-frame. In this way, an image display at 240 Hz is realized. In the black insertion sub-frame, the light source of the self-luminous panel 14 may be turned off.

In order to compensate for the luminance of the pixel reduced by the black insertion, the display device 1 displays each pixel at the luminance level having brightness obtained by doubling the luminance value level in the image data, in the first-half sub-frame and the second-half sub-frame. In this way, for example, the doubled luminance level of each pixel in the n-th first-half sub-frame, and the value 0 of the luminance level in the black insertion sub-frame subsequent to the n-th first-half sub-frame are time-averaged. Therefore, the user can visually recognize the luminance level having the brightness equivalent to the luminance level in the image data.

Moving-Picture Blur Waveform

Figure 25:
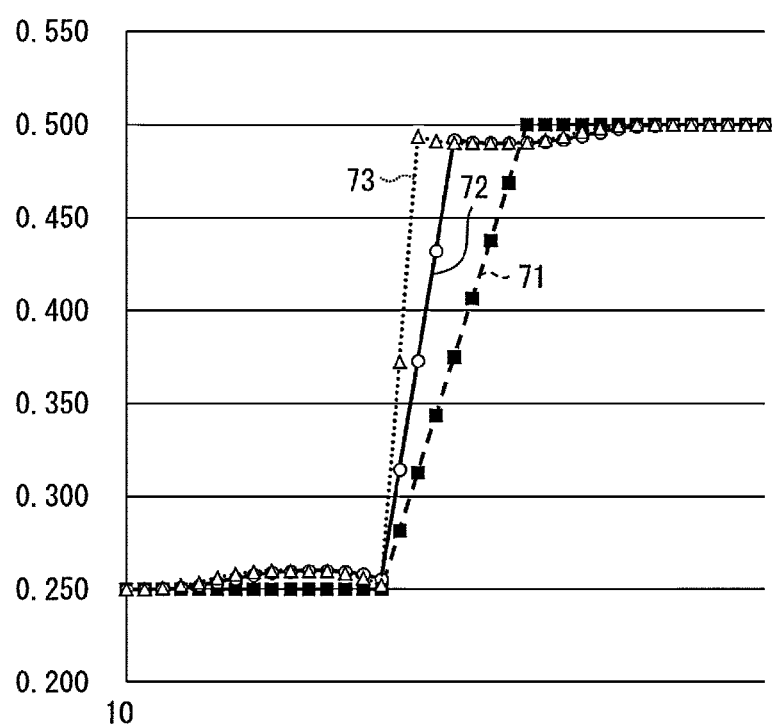
FIG. 25 is a diagram illustrating a moving-picture blur waveform visually recognized by the user.

FIG. 25 is a diagram illustrating a moving-picture blur waveform visually recognized by the user. A graph 71 is a graph showing a distribution of actual luminance levels visually recognized by the user when a moving picture is displayed at 60 Hz as illustrated in FIG. 20. A graph 72 is a graph showing a distribution of actual luminance levels visually recognized by the user when a moving picture is driven at double speed and displayed at 120 Hz as illustrated in FIG. 21. A graph 73 is a graph showing a distribution of actual luminance levels visually recognized by the user when a moving picture is driven at double speed and displayed at 240 Hz as illustrated in FIG. 24. The graphs 71 and 72 are the same as the graphs 71 and 72 shown in FIG. 20. The graph 73 corresponds to a moving-picture blur waveform when the moving picture is driven at double speed and displayed at 240 Hz using a method according to the second embodiment of the disclosure. As illustrated in FIG. 25, the width of the edge of the luminance levels included in the graph 73 is further smaller than the width of the edge of the luminance levels included in the graph 72. Since the display device 1 can suppress the degree of the moving-picture blur occurring at the edge when the moving picture is displayed at 240 Hz in this manner, two effects, namely, quality improvement of the moving picture due to the black insertion and reduction in the moving-picture blur can be achieved. Therefore, it is possible to further improve the overall display quality of the moving picture.

Modified Example

Figure 26:
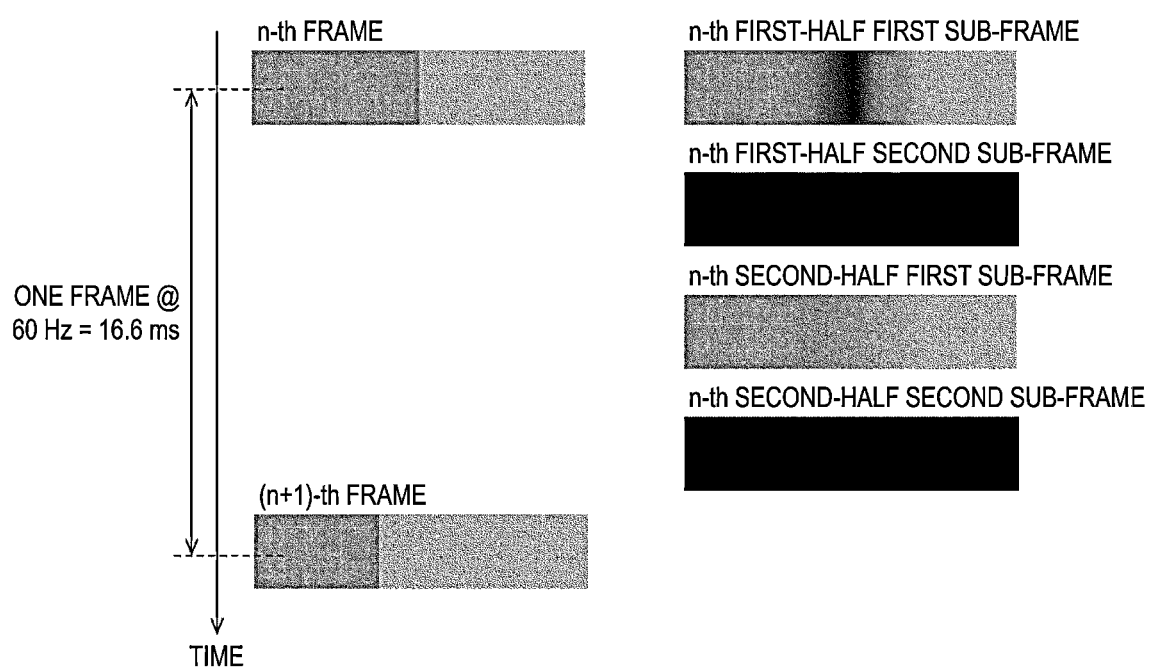
FIG. 26 is a diagram illustrating an example of image data used for displaying a moving picture at 240 Hz in a modified example of the second embodiment according to the disclosure.

FIG. 26 is a diagram illustrating an example of image data used for displaying a moving picture at 240 Hz in a modified example of the second embodiment according to the disclosure. In the modified example, the display device 1 converts input image data of 60 Hz into the image data of 120 Hz illustrated in FIG. 23, and then further converts the data into data of 240 Hz. At this time, the display device 1 divides the n-th first-half sub-frame into an n-th first-half first sub-frame and an n-th first-half second sub-frame each having half the length of the n-th first-half sub-frame. Then, the luminance level of the first-half sub-frame before the division is set as the luminance level of the n-th first-half first sub-frame. Further, the luminance level of the n-th first-half second sub-frame is set to a luminance level 0 corresponding to black.

Similarly, the n-th second-half sub-frame is divided into an n-th second-half first sub-frame and an n-th second-half second sub-frame each having half the length of the n-th second-half sub-frame. Then, the luminance level of the n-th second-half sub-frame before the division is set as the luminance level of the n-th second-half first sub-frame. Further, the luminance level of the n-th first-half second sub-frame is set to a luminance level 0 corresponding to black. In this manner, display data is generated that includes the emphasized luminance data in the n-th first-half first sub-frame, the luminance data for black display in the n-th first-half second sub-frame, the blurred luminance data in the n-th second-half first sub-frame, and the luminance data for black display in the n-th second-half second sub-frame.

FIG. 27 is a diagram illustrating luminance levels of converted image data of 240 Hz in the modified example of the second embodiment according to the disclosure, and actual luminance levels visually recognized by the user when a moving picture is displayed at 240 Hz. The self-luminous panel 14 reproduces the moving picture at 240 Hz by using the image data of 240 Hz illustrated in FIG. 27 as it is. In other words, there is no need to separately add the black insertion sub-frame. In the present example as well, since it is possible to suppress the degree of the moving-picture blur occurring at the edge when the moving picture is displayed at 240 Hz, the two effects, namely, the quality improvement of the moving picture due to the black insertion and the reduction in the moving-picture blur can be achieved. Therefore, it is possible to further improve the overall display quality of the moving picture.

Note that, in addition to the black insertion, the luminance data conversion method according to the disclosure may be combined with a bright-dark driving method. For example, a luminance level obtained by causing the luminance level of the n-th first-half sub-frame to be brighter may be assigned to the n-th first-half first sub-frame, and a luminance level obtained by causing the luminance level of the n-th first-half sub-frame to be darker may be assigned to the n-th second-half second sub-frame. In this case, a time-averaged luminance level of the luminance level of the n-th first-half first sub-frame and the luminance level of the n-th first-half second sub-frame may be the same as the luminance level of the n-th first-half sub-frame.

Another Modified Example

In the present embodiment, for convenience of description, an example has been described in which, among the pixels in the periphery of the pixel of interest, only the pixels arranged in the periphery in the same row as that of the pixel of interest are specified as the peripheral pixels. However, no such limitation is intended, and the display device 1 may also specify the pixels arranged in the periphery of the pixel of interest in the vertical direction and the diagonal direction as the peripheral pixels. Specifically, when the pixel of interest is superimposed on the center A55 of the filter 31 in the L-th row of the image of the n-th frame, all of the total of 80 pixels respectively superimposed on the filter values other than the A55 in the filter 31 may be specified as the peripheral pixels. As a result, pixels arranged in the periphery of the pixel of interest in the horizontal direction, the vertical direction, and the diagonal direction can be specified as the peripheral pixels.

The shape of the filter 31 may be any planar shape other than the square. Specifically, the filter 31 may be a filter having any planar shape in which a plurality of filter values are arranged in a planar manner. Examples of such a shape include a rectangle, a circle, and an elliptical shape.

The filter 31 may take any size other than the size of nine rows and nine columns. Each of the filter values included in the filter 31 may be any value other than the filter value illustrated in FIG. 8.

That is, the image data converter 2 may determine the gray scale levels of pixels of the image in the n-th first-half sub-frame and the gray scale levels of pixels of the image in the n-th second-half sub-frame based on the gray scale levels of pixels of the image in the n-th frame. In the present example, the conversion data for the n-th first-half sub-frame and the conversion data for the n-th second-half sub-frame need to be implemented as a conversion table in which the correspondence relationship between the input gray scale levels and the output gray scale levels is defined in consideration of the gamma characteristics of the self-luminous panel 14.

The display device 1 may include any display panel other than the self-luminous panel 14 capable of high-speed response. For example, the display device 1 may include a display panel having a response speed lower than that of the self-luminous panel 14. In this case, it is desirable to appropriately adjust the correspondence relationship between the input luminance levels and the output luminance levels in the conversion data illustrated in FIG. 12 in accordance with the response speed of the display panel included in the display device 1.

Supplement

A display device according to a first aspect of the disclosure is a display device in which one frame is divided into a first-half sub-frame and a second-half sub-frame, and an image is displayed in each of the first-half sub-frame and the second-half sub-frame. The display device includes an emphasis processing unit configured to generate emphasized Y luminance data by performing luminance emphasis processing on only Y luminance data included in YUV data representing an image of one frame, a blur processing unit configured to generate blurred Y luminance data by performing luminance blur processing on only the Y luminance data, a first coupling unit configured to generate emphasized YUV data representing an image of the second-half sub-frame by coupling the emphasized Y luminance data with U color difference data and V color difference data included in the YUV data, and a second coupling unit configured to generate blurred YUV data representing the image of the second-half sub-frame by coupling the blurred Y luminance data with the U color difference data and the V color difference data.

In the first aspect described above, a display device according to a second aspect of the disclosure may further include a compression unit configured to generate compressed Y luminance data by compressing the Y luminance data. The emphasis processing unit may generate the emphasized Y luminance data based on the compressed Y luminance data, and the blur processing unit may generate the blurred Y luminance data based on the compressed Y luminance data.

In the second aspect described above, in a display device according to a third aspect of the disclosure, the emphasis processing unit may be configured to generate compressed blurred Y luminance data by performing the blur processing on the compressed Y luminance data of a current frame, generate blurred Y luminance data for emphasis by expanding the compressed blurred Y luminance data, and generate the emphasized Y luminance data by adding, to the Y luminance data, a difference between the blurred Y luminance data for emphasis and the Y luminance data.

In the second or third aspect described above, in a display device according to a fourth aspect of the disclosure, the blur processing unit may be configured to generate average compressed Y luminance data by calculating an average of luminance of each pixel of the compressed Y luminance data of a current frame and the compressed Y luminance data of a subsequent frame, and generate average compressed blurred Y luminance data by performing the blur processing on the average compressed Y luminance data.

In any one of the first to fourth aspects described above, a display device according to a fifth aspect of the disclosure may include a display panel, a display data generation unit configured to generate display data including the blurred Y luminance data and the emphasized Y luminance data, and a display processing unit configured to display an image represented by the display data on the display panel, by outputting the display data to the display panel. When displaying the display data on the display panel, the display processing unit may reduce a length of each of the first-half sub-frame and the second-half sub-frame to half, and may add a black insertion sub-frame for black display after each of the sub-frames.

In any one of the first to fourth aspects described above, a display device according to a sixth aspect of the disclosure may include a display panel, a display data generation unit configured to generate display data including the blurred Y luminance data and the emphasized Y luminance data, and a display processing unit configured to display an image represented by the display data on the display panel, by outputting the display data to the display panel. The display data generation unit may be configured to divide the first-half sub-frame into a first-half first sub-frame and a first-half second sub-frame, divide the second-half sub-frame into a second-half first sub-frame and a second-half second sub-frame, and generate the display data including the emphasized Y luminance data in the first-half first sub-frame, luminance data for black display in the first-half second sub-frame, the blurred Y luminance data in the second-half first sub-frame, and the luminance data for black display in the second-half second sub-frame.

The disclosure is not limited to each of the embodiments described above, and various modifications may be implemented within a range not departing from the scope of the claims. Embodiments obtained by appropriately combining technical approaches stated in each of the different embodiments also fall within the scope of the technology of the disclosure. Novel technical features may also be formed by combining the technical approaches stated in each of the embodiments.

REFERENCE SIGNS LIST

1 Display device
2 Image data converter
4 Panel module unit
11 Main calculation unit
12 Data converter
13 OD gray scale calculation unit
14 OLED panel
15 First-half sub-frame coefficient determination unit
21 Frame memory
22 Frame memory
23 Data compression unit
24 Blur/emphasis calculation unit
25 Data coupling unit
26 RGB data generation unit
31 Filter
41 First-half sub-frame blur processing unit
42 First-half sub-frame luminance expansion processing unit
43 First-half sub-frame emphasized luminance determination unit
51 Second-half sub-frame luminance averaging processing unit
52 Second-half sub-frame blur processing unit
53 Second-half sub-frame luminance expansion processing unit
61 First-half sub-frame YUV coupling unit
62 Second-half sub-frame YUV coupling unit

The invention claimed is:

1. A display device in which one frame is divided into a first-half sub-frame and a second-half sub-frame, and an image is displayed in each of the first-half sub-frame and the second-half sub-frame, the display device comprising:
an emphasis calculator to generate emphasized Y luminance data by performing luminance emphasis processing on only Y luminance data included in YUV data representing an image of one frame;
a blur calculator to generate blurred Y luminance data by performing luminance blur processing on only the Y luminance data;
a first-half sub-frame YUV coupler to generate emphasized YUV data representing an image of the first-half sub-frame by coupling the emphasized Y luminance data with U color difference data and V color difference data included in the YUV data; and
a second half sub-frame YUV coupler to generate blurred YUV data representing an image of the second-half sub-frame by coupling the blurred Y luminance data with the U color difference data and the V color difference data.

2. The display device according to claim 1, further comprising
a data compressor to generate compressed Y luminance data by compressing the Y luminance data,
wherein the emphasis calculator generates the emphasized Y luminance data based on the compressed Y luminance data, and
the blur calculator generates the blurred Y luminance data based on the compressed Y luminance data.

3. The display device according to claim 2,
wherein the emphasis calculator;
generates compressed blurred Y luminance data by performing the blur processing on the compressed Y luminance data of a current frame,
generates blurred Y luminance data for emphasis by expanding the compressed blurred Y luminance data, and
generates the emphasized Y luminance data by adding, to the Y luminance data, a difference between the blurred Y luminance data for emphasis and the Y luminance data.

4. The display device according to claim 2,
wherein the blur calculator;
generates average compressed Y luminance data by calculating an average of luminance of each pixel of the compressed Y luminance data of a current frame and the compressed Y luminance data of a subsequent frame, and
generates average compressed blurred Y luminance data by performing the blur processing on the average compressed Y luminance data.

5. The display device according to claim 1, comprising:
a display panel;
a data converter to generate display data including the blurred Y luminance data and the emphasized Y luminance data; and
a gray scale calculator to display an image represented by the display data on the display panel, by outputting the display data to the display panel,
wherein, when displaying the display data on the display panel, the gray scale calculator reduces a length of each of the first-half sub-frame and the second-half sub-frame to half, and adds a black insertion sub-frame for black display after each of the sub-frames.

6. The display device according to claim 1, comprising:
a display panel;
a display data converter to generate display data including the blurred Y luminance data and the emphasized Y luminance data; and
a gray scale calculator to display an image represented by the display data on the display panel, by outputting the display data to the display panel,
wherein the data converter;
divides the first-half sub-frame into a first-half first sub-frame and a first-half second sub-frame,
divides the second-half sub-frame into a second-half first sub-frame and a second-half second sub-frame, and
generates the display data including the emphasized Y luminance data in the first-half first sub-frame, luminance data for black display in the first-half second sub-frame, the blurred Y luminance data in the second-half first sub-frame, and the luminance data for black display in the second-half second sub-frame.

\* \* \* \* \*